United States Patent
Bronte

Patent Number: 6,061,709
Date of Patent: May 9, 2000

[54] INTEGRATED HARDWARE AND SOFTWARE TASK CONTROL EXECUTIVE

[75] Inventor: Jeffrey S. Bronte, San Diego, Calif.

[73] Assignee: Integrated Systems Design Center, Inc., San Diego, Calif.

[21] Appl. No.: 09/127,156

[22] Filed: Jul. 31, 1998

[51] Int. Cl.$^7$ .................................................. G06F 9/00
[52] U.S. Cl. .......................................... 709/103; 709/102
[58] Field of Search .................................. 709/100, 102, 709/103, 104, 108

[56] References Cited

U.S. PATENT DOCUMENTS

| | | | |
|---|---|---|---|
| 4,823,256 | 4/1989 | Bishop et al. ........................... | 364/200 |
| 5,247,677 | 9/1993 | Welland et al. ......................... | 995/650 |
| 5,465,335 | 11/1995 | Anderson ................................. | 709/105 |
| 5,530,858 | 6/1996 | Stanley et al. ........................... | 395/550 |
| 5,640,563 | 6/1997 | Cormon .................................. | 709/102 |
| 5,983,266 | 11/1999 | Tadman et al. .......................... | 709/216 |

*Primary Examiner*—Majid A. Banankhah
*Attorney, Agent, or Firm*—Fish & Richardson P.C.

[57] ABSTRACT

A method and system for permitting a software-based executive to execute concurrently with a hardware-based executive. The software-based executive allocates hardware executive tasks, hardware executive interrupts, software executive tasks, and software executive interrupts to defined execution spaces available on a microprocessor having a hardware-based executive. Applications control hardware-based executive tasks and interrupts through a hardware executive application programming interface (API), and software-based executive tasks through a software executive API. Applications share the hardware executive API functions for interrupt installation and management. The invention allocates all hardware executive interrupts to a high priority interrupt execution space, and all hardware executive tasks to a high priority queue. All software executive interrupts are allocated to low priority interrupts, and all software executive tasks are allocated to a low priority queue. The software executive uses a special context switch mechanism that changes the currently executing task without creating another low priority task. In this way, the low priority hardware scheduler is always disabled, and low priority tasks are always under the control of the software executive. A hierarchical "enables" mechanism protects critical sections of code during reentrancies. An interrupt return revectoring mechanism is provided to provide a mechanism for preemption. When a software executive interrupt occurs, the interrupt return revectoring mechanism exits the interrupt and revectors into the software kernel so that a new kernel task can begin executing, rather than returning to the previously executing task. A mechanism is also provided to accommodate block move operations.

16 Claims, 13 Drawing Sheets

INTEGRATED HARDWARE AND SOFTWARE TASK CONTROL EXECUTIVE

TECHNICAL FIELD

The present invention relates to multitasking operating systems, and more particularly to a task control executive that combines hardware and software task control methods.

BACKGROUND

Since the invention of the microprocessor, integrated circuit densities have continued to increase, resulting in more powerful processors as well as more peripherals integrated onto the same chip. In recent years, complete "systems on a chip" have become available to serve processor intensive applications such as digital video or network communications in low cost consumer applications. FIG. 1 is a block diagram that illustrates the architecture of a commercially available microprocessor 10 (the STi5500 from SGS-Thomson Microelectronics) that exemplifies this high degree of integration. The STi5500 is a highly integrated chip with a RISC processor core and over a dozen on-chip peripherals needed to form a complete digital video system on a single chip. This microprocessor 10 provides a low cost solution for digital video applications such as satellite digital television receivers and digital video disk players. However, in order to create a "real-time" video signal from an encoded digital video stream, some processes must be performed in hardware and some in software, with great emphasis on synchronizing events. Accordingly, a real-time multitasking operating system is typically used with such a microprocessor 10.

As processors have become more powerful and more sophisticated peripherals have been integrated on chip, the demands of real-time multitasking operating systems have increased as well. Real-time multitasking operating systems, known also as real-time executives, have been prevalent for many years. Most real-time executives are designed for microprocessors and have special characteristics that are different from non-realtime operating systems. These characteristics include fast response time to external events, fast context switch time, deterministic operation, and preemptive and priority based scheduling. It is these characteristics that determine a real-time executive's system performance.

Most real-time executives are designed as software-only systems, taking advantage of a microprocessor's instruction set for performing the primitive functions that make up the building blocks of a real-time executive. A real-time executive generally consists of three parts: an application interface; executive functions; and kernel operations. The application interface provides a standard set of function calls used to manage both the task operations and other operating system services such as memory management or message handling. The executive functions are the operations that occur when a particular application interface function is invoked. Finally, at the core of the operating system, is the kernel. The kernel provides the primitive operations to manage multiple tasks and interrupts according to their assigned priorities and current state. The primary primitive functions of the kernel include context switching, scheduling, and critical section protection.

FIG. 2 is a conceptual block diagram of a software-only real-time executive architecture. Applications 90 execute on a processor 92 by accessing executive functions of a real-time executive 95 through an application programming interface (API) 100. The API 100 in turn enters a kernel 101 to perform scheduling or context switching functions. For preemptive events which occur asynchronously to the currently running task, an interrupt I/O mechanism 102 must be in place to allow kernel functions to be invoked while the processor is within an interrupt. While in an interrupt, kernel functions are called 103 using the API 100 in a reentrant manner.

U.S. Pat. No. 5,247,675 discloses a preemptive multipriority multitasking real-time operating system. This conventional software-based system is well represented in the art. Many microprocessors that are not dedicated to desktop computers run some type of real-time executive of a similar design.

Some real-time operating systems have been implemented such that some of the kernel primitive functions have been allocated to hardware circuitry, either as a component external to the processor or integrated within the processor's instruction set. For example, U.S. Pat. No. 4,964,040 discloses a computer hardware executive that is a special purpose associative processor. It serves as a real-time kernel and provides high speed executive functions such as task registration, task synchronization, scheduling, event handling, and buffer management. This hardware executive provides high speed and high performance kernel operations, but is not commercially viable for today's highly competitive markets, primarily due to the cost of the extra external chip. Additionally, the standalone hardware kernel cannot tightly integrate with on-chip peripherals seen on today's highly integrated processors that have signal processing, direct memory access, compression/decompression, and/or encoding/decoding functions.

The commercially available STi5500 microprocessor incorporates a hardware-only scheduler integrated into its instruction set. (That is, most portions of the hardware executive reside in the STi5500 processor's CPU, and the rest is part of a hardware executive API). The extended instruction set includes not only real-time executive functions and primitives, but also includes tight integration with peripherals so that scheduling activities can quickly and automatically occur without application intervention, once a hardware operation has completed and software processing needs occur immediately thereafter. The time it takes a system to respond to an event (usually a hardware event) and begin associated software processing is defined as "latency".

FIG. 3 is a conceptual block diagram of a hardware-only executive architecture 105, modeled on the STi5500 microprocessor. As with the software-only model shown in FIG. 2, the hardware-only model uses an API 106 to access executive functions. However, in this case, those executive functions are implemented as a hardware kernel 107 within the microprocessor itself, rather than in a software kernel 101. The diagram also shows two paths between the processor 92 and the kernel 107. The first path is a channel I/O 110 mechanism that can schedule processing automatically. The second path is a more traditional interrupt I/O 111 mechanism where an interrupt is generated by a hardware event, and a kernel function is called 112 through the API 106 in a reentrant manner in order to schedule processing or perform a kernel function.

The hardware executive processor architecture of FIG. 3 has been utilized in a family of integrated chips, all with the same CPU core, designed by SGS-Thomson Microelectronics. Numerous applications have used the hardware-based kernel. Experience with the hardware-based kernel has made it clear that a better task control executive is needed for the system. The problem with the hardware-only executive is that the system is not preemptive. For example, FIG. 4 is a block diagram that illustrates a system of multiple tasks using a CPU core of the type shown in FIG. 3. There are four execution spaces: high priority interrupts 120, a high priority execution queue 121, low priority interrupts 122, and a low priority execution queue 123. In terms of task priorities, there are only two, high and low. The high priority queue 121 executes round robin, and each task executes until it deschedules itself. When a high priority interrupt 120 occurs, and it needs to schedule processing, the hardware scheduler can only put the task or thread at the end of the high priority queue 121. Thus, all currently queued high priority threads must execute to completion before the new thread, as scheduled by the interrupt, can execute. The problem with this is that the latency between the hardware event and the processing to handle the event is often too large to acceptably process time-critical applications such as video decoding.

The low priority queue 123 differs from the high priority queue 121 in that it has a "timeslicing" component. If a task executes for longer than a timeslice period, the hardware scheduler automatically deschedules the task and goes on to the next task in the queue. Again, latency is a problem because the task that was timesliced will not execute again until all other queued threads in the low priority queue 123 have been executed and the queue has wrapped around to the timesliced task. In this case, the forced latency prevents the system from giving the remaining processor time to the non-realtime processor intensive tasks, slowing down the system throughput.

The problems above with the high and low priority queues are made worse in more highly integrated chips because there are more peripherals to manage and interface with. Also, the applications that these chips are currently targeted for include many traditional operating system features that require much more processor resources. Examples include file systems, network protocol stacks, Java language interpreters, and encryption/decryption. In addition to task management problems with the high and low priority queues, the hardware kernel 107 lacks some common and important facilities that are prevalent in many software-based executives. For example, the hardware kernel has timers and messages, but there is no message timeout. Also, software-based executives provide application layers that can be easily added, such as protocol stacks or file systems, whereas these would have to be recreated for a hardware-based kernel.

The many deficiencies described above led to the development by the present inventor of a software-based kernel hosted on a microprocessor having a "system on a chip" type of architecture (e.g., the STi55000 microprocessor) that was intended to solve all of the problems noted above. One design limitations was that the hardware scheduler could not be used, since it can automatically context switch without the knowledge of the software kernel, thus causing a loss of context. However, one implementation of such a software-based kernel design was found not to provide the performance necessary for certain peripherals. Additionally, there were peripherals that required the use of channel I/O 110 rather than interrupt I/O 111. This was a critical problem because channel I/O 110 requires the use of the scheduler function of the hardware kernel 197, which was disallowed with that implementation of the software-based executive. These problems with hosting a software-based scheduler on such a chip were an unexpected discovery and presented a fundamental problem to solve in order to have any viable products based on the chip.

The possible performance gains of permitting hardware scheduler operations are illustrated in FIGS. 5, 6, and 7. FIG. 5 is a timing diagram that illustrates a standard path beginning with a hardware event and finishing with a task performing processing in response to the hardware event for a software-based executive. (The relative times are derived from an analysis of a current version of the STi5500 microprocessor and are exemplary only.) The sequence begins with the hardware inducing an interrupt 130 that preempts task processing 134. The interrupt 130 first executes a kernel interrupt entry call 131, then executes a kernel service call 132 (such as a semaphore). Next, an interrupt exit call 133 is executed. With the assumption that the kernel service call 132 requires scheduling, the interrupt 130 is exited and revectoring 135 is performed to enter the kernel scheduler. Finally, kernel scheduling 136 is completed and the corresponding task begins executing 137 in response to the interrupt 130 induced by the hardware event. Using the fastest kernel call and with no other latencies, such as a high priority task or a higher priority interrupt, the hardware event to software processing latency time is about 45 $\mu$S best case.

If hardware scheduling is allowed for the fastest real-time events, the channel I/O 110 and interrupt I/O 111 hardware scheduling methods can be used. FIG. 6 is a timing diagram that illustrates the sequence of execution that is performed automatically by a hardware scheduler upon the receipt of a channel I/O 110 event. When the channel event 140 occurs, low priority processing 141 is preempted. When the channel event 140 completes, the hardware scheduler 142 context switches to event processing 143 that was waiting for the channel I/O event. In this case, the hardware event to software processing latency time is about 0.5 $\mu$S best case, nearly 100 times faster than the software-only kernel latency time.

For peripherals that do not support channel I/O, the interrupt I/O 111 method of event processing is used. FIG. 7 is a timing diagram that shows the sequence of execution for interrupt I/O using a hardware executive. When an interrupt event occurs 150, the low priority task is preempted 151 and an interrupt service routine begins processing. The interrupt service routine makes a hardware executive service call 152 and then the interrupt service routine exits 153. The hardware scheduler 154 then switches context to the event processing routine 155 that was waiting for the hardware executive service call 155 (e.g., a semaphore). The interrupt event to software processing for this case is around 6 $\mu$S, which is still around 7 times faster than the software-based executive model of FIG. 5.

In summary, a central problem in the art is that using a hardware scheduler alone causes one type of latency, and using a software scheduler alone causes a different type of latency. Each of the types of latencies can cause errors in the signal processing, causing potential errors in the resultant output (e.g., dropouts in a video signal). Further, certain hardware peripherals require the use of a hardware scheduler for data transfer, even if it is desirable to use software scheduling for other functions and general ease of use. However, because of the problems described above, to the best of the inventor's knowledge, the art has not taught how to effectively combine a software-based executive with a hardware-based executive, particularly for a "system on a chip" type of microprocessor.

The inventor has determined that it would be highly useful to be able to utilize a hardware-based executive on a "system on a chip" type of microprocessor while still being able to take advantage of the functions of a software-based executive. Accordingly, a general object of the present invention is to permit a software-based executive to execute concurrently with a hardware-based executive.

Another object of the invention is to minimize latencies in hardware-based executive interrupts and tasks caused by a software-based executive.

A further object of the invention is to integrate with the hardware executive API for the creation and management of hardware executive interrupts and tasks.

Still another object of the invention is to integrate the software-based executive interrupt management with the hardware-based executive interrupt management and associated API. In other words, both the hardware and software executives should have the same interrupt management, functions, and API.

Yet another object of the invention is to provide a mechanism that allows hardware-based executive tasks and interrupts to communicate with software-based tasks.

SUMMARY

The software-based executive of the invention overcomes the foregoing problems by appropriately allocating hardware executive tasks, hardware executive interrupts, software executive tasks, and software executive interrupts to the execution spaces available on a microprocessor having a hardware-based executive. Additionally, the invention uses the processor's instruction set and registers to accomplish the previously stated objects.

The preferred embodiment of the invention is implemented by modifying a commercially available software-based executive to operate in conjunction with a hardware-based executive. Applications control hardware-based executive tasks and interrupts through the hardware executive API. Similarly, applications control software-based executive tasks through the software executive API. Applications share the hardware executive API functions for interrupt installation and management, regardless of whether the interrupts are being used for the software executive or the hardware executive.

In the preferred embodiment, the hardware-based executive provides two methods for responding to hardware events, and the software executive provides a third method. In one hardware-based method, the hardware executive task or interrupt may invoke software executive functions through a special interface. In the second hardware-based method, hardware-based interrupts can communicate with the hardware kernel by using the corresponding hardware-based API, thereby permitting reentrancy. Similarly, software-based interrupts communicate with the software kernel also by using the corresponding software-based API, resulting in reentrancy of a different type. Hardware channel I/O does not need to make hardware executive API calls to affect scheduling, since the channel I/O operation is an implicit hardware scheduling operation of the kernel.

The preferred microprocessor used in one implementation of the invention has four primary execution spaces: high priority interrupts, a high priority queue, low priority interrupts, and a low priority queue. The invention allocates all hardware executive based interrupts to the high priority interrupt execution space. All hardware executive based tasks are allocated to the high priority queue. All software executive based interrupts are allocated to low priority interrupts. Finally, all software executive tasks are allocated to the low priority queue.

The software-based tasks execute in the low priority queue space, but are not actually a queue. The processor's hardware scheduler is disabled when only one task exists in the queue. The software executive uses a special context switch mechanism that changes the currently executing task without creating another low priority thread. In this way, the low priority hardware scheduler is always disabled, and low priority tasks are always under the control of the software executive.

An "enables" mechanism exists to protect critical sections of code during reentrancies. The enables mechanism is hierarchical and performs enables/disables of interrupts and tasks. This important component determines system performance since it causes latencies while tasks or interrupts are disabled. Also, enabling of processor traps, which is part of the enables mechanism, are handled such that the processor's runtime and on-chip debugging functions are not corrupted.

An interrupt return revectoring mechanism is provided to provide a mechanism for preemption. When a software executive interrupt occurs, the interrupt return revectoring mechanism exits the interrupt and revectors into the software kernel so that a new kernel task can begin executing, rather than returning to the previously executing task. While interrupt revectoring is a common technique used in preemptive priority based operating systems, this invention uses a technique designed specifically to accommodate the existence of hardware executive based tasks and interrupts. Additionally, this mechanism was designed to operate in a manner consistent with the interrupt management mechanisms used by the hardware executive.

A mechanism is also provided to accommodate block move operations. Block move operations occur when fast data movement is necessary. When the data move is interrupted by a software executive interrupt, the processor's registers must be handled accordingly or the block move will not complete properly when the task is rescheduled later.

In the preferred embodiment, accommodations were made in the software executive's task stack frames, global data area, and handling of trap enables, to permit using the same commercial debugger for both the hardware executive and the software executive.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Implementation Environment

One embodiment of the invention has been implemented as a modification to a conventional software executive, the pSOS+ kernel from Integrated Systems Design Center, Inc., the assignee of the present invention, for operation on a microprocessor having a hardware-based executive, such as the STi5500. Prior to modification, the commercially available software kernel was tested and operational on an STi5500 microprocessor, but operated in a conventional manner without accommodation for the hardware kernel.

For ease of explanation, this particular embodiment of the invention will be described with reference to this software executive and this microprocessor. However, it should be understood that the principles of the invention may be utilized to create or adapt another software executive to operate on another model microprocessor. More particularly, each design component or modification is described in the context of the conventional software executive's operation, and is important to operate the system in a mode in which both the hardware and software executives execute concurrently.

Overview

Figure 1:
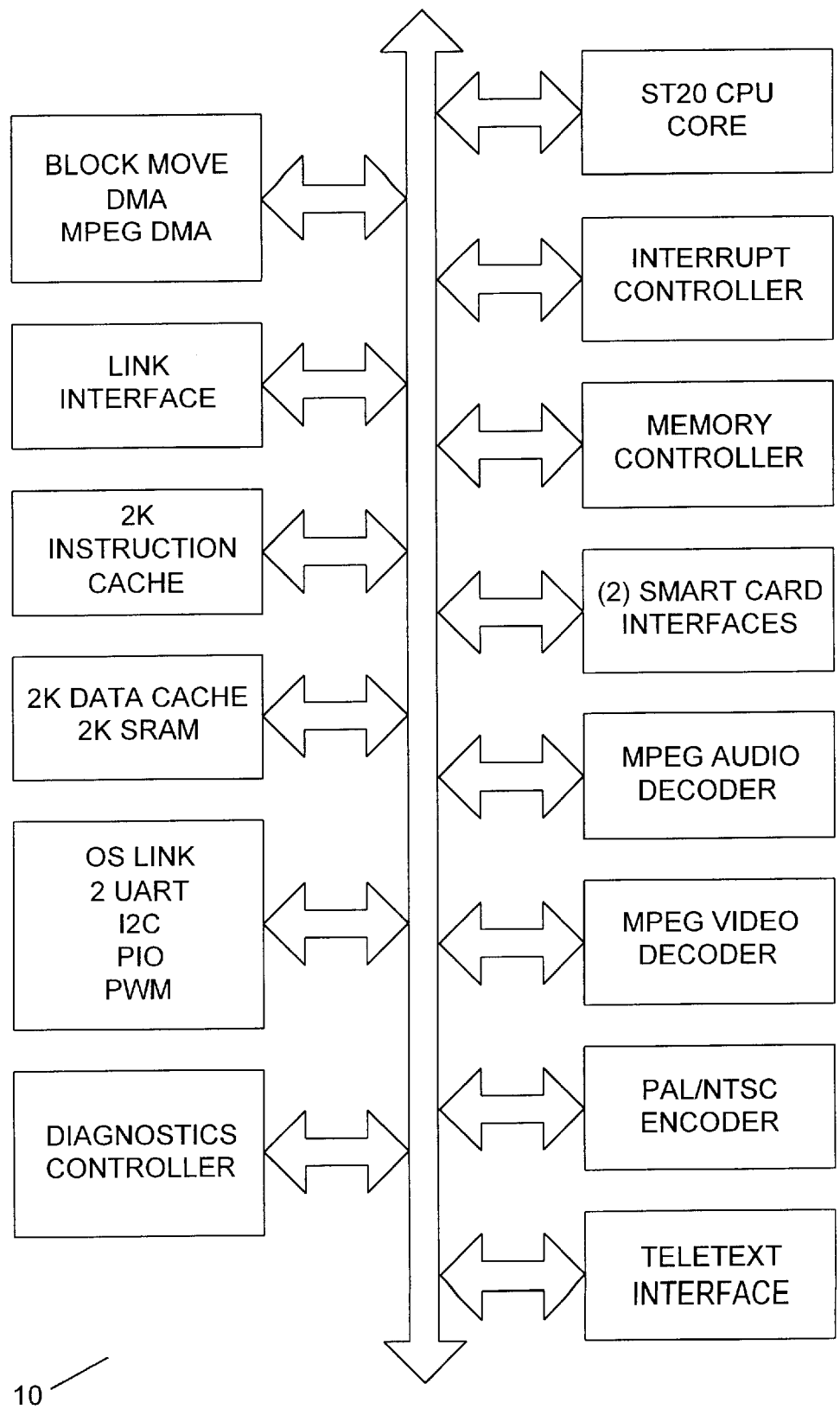
FIG. 1 is a block diagram that illustrates the architecture of a commercially available microprocessor.
Figures 2, 3:
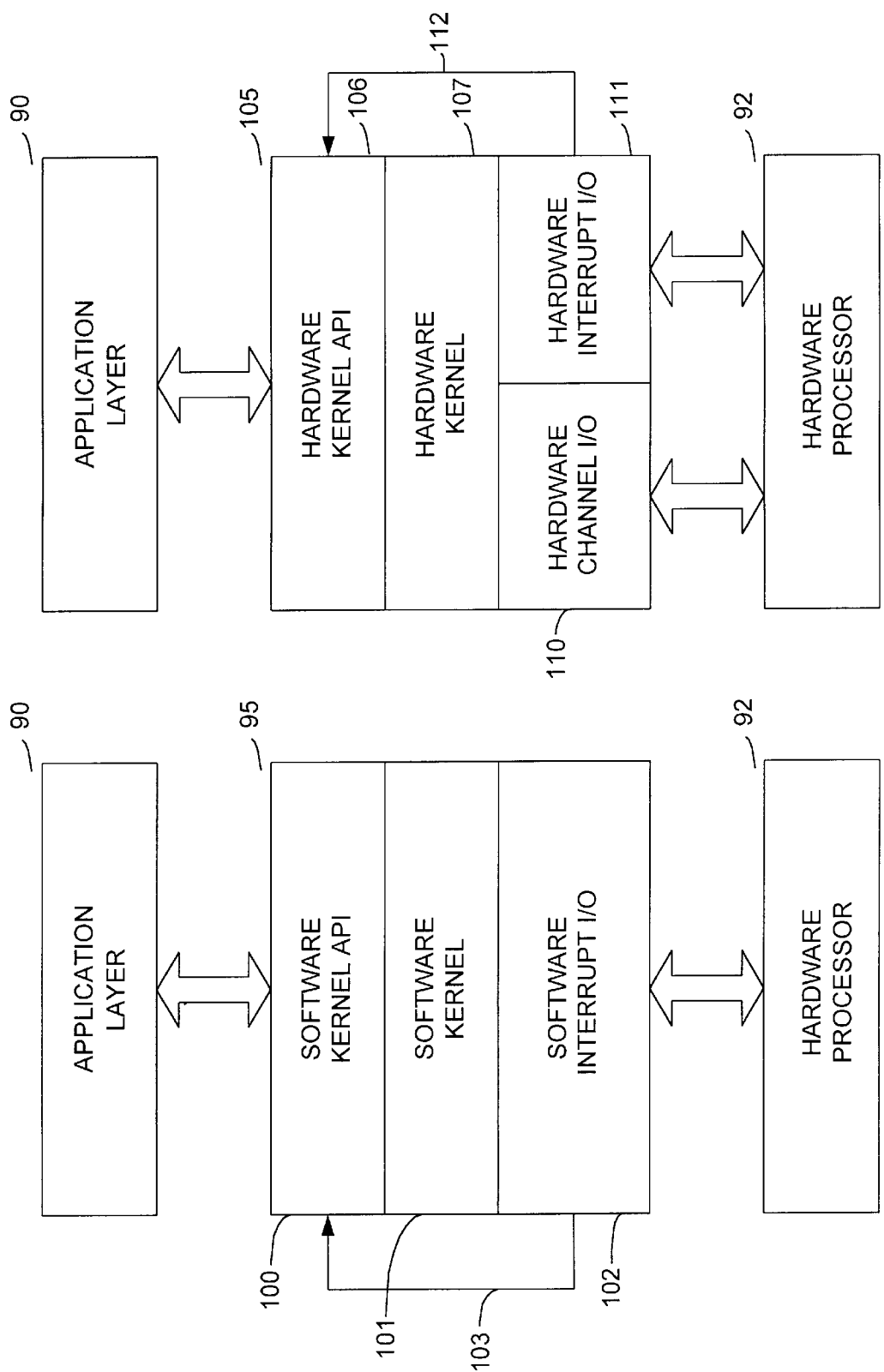
FIG. 2 is a conceptual block diagram of a software-only real-time executive architecture.
FIG. 3 is a conceptual block diagram of a hardware-only executive architecture.
Figure 4:
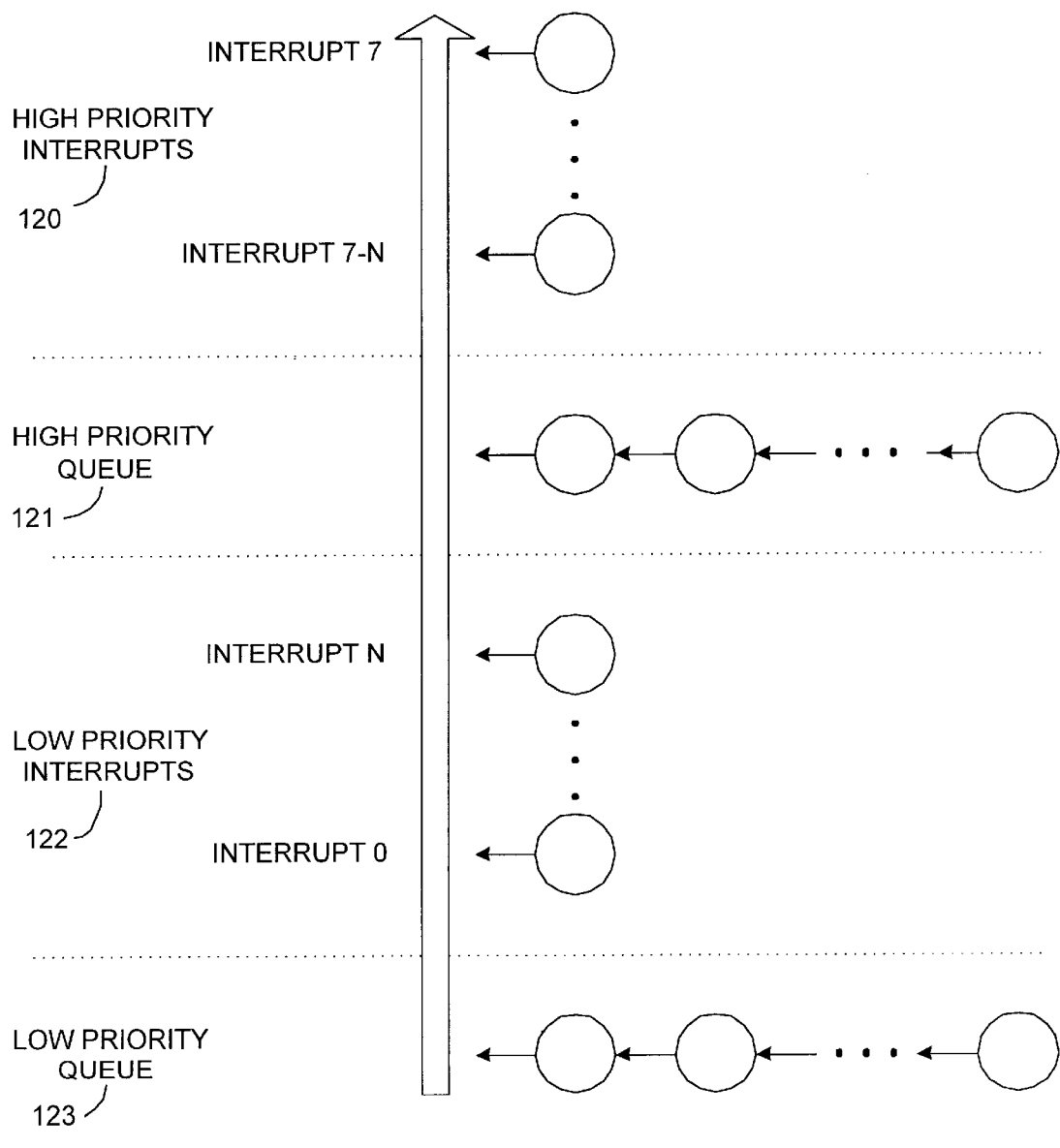
FIG. 4 is a block diagram that illustrates a system of multiple tasks using a CPU core of the type shown in FIG. 3.
Figure 5:
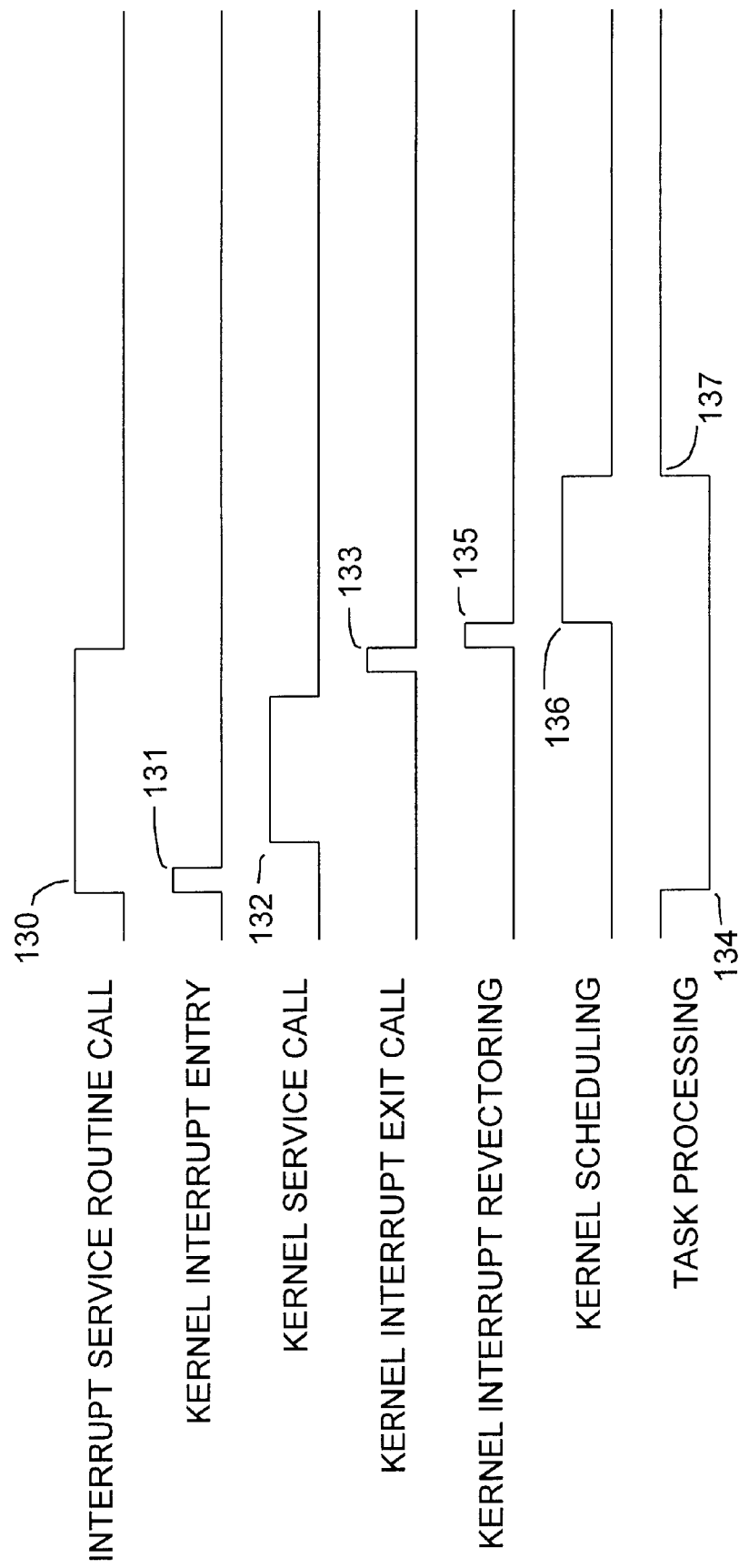
FIG. 5 is a timing diagram that illustrates a standard path beginning with a hardware event and finishing with a task performing processing in response to the hardware event for a software-based executive of the type shown in FIG. 2.
Figure 6:
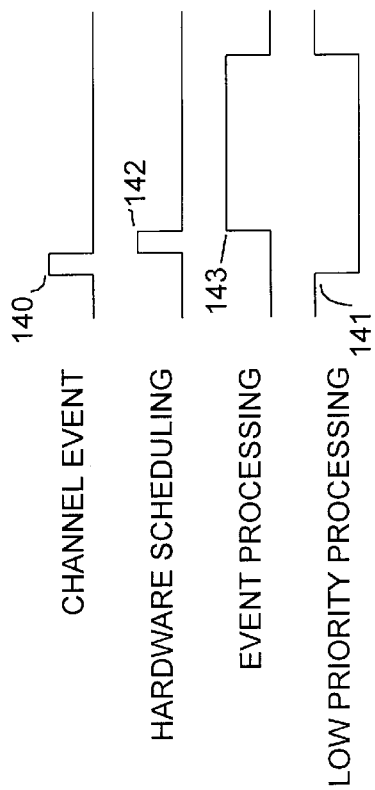
FIG. 6 is a timing diagram that illustrates the sequence of execution that is performed automatically by a hardware scheduler upon the reception of a channel I/O event using a hardware executive of the type shown in FIG. 3.
Figure 7:
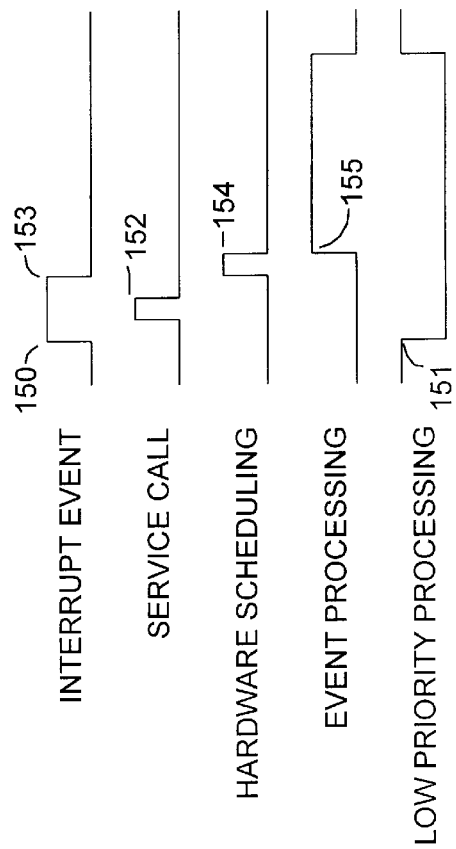
FIG. 7 is a timing diagram that shows the sequence of execution for interrupt I/O using a hardware executive of the type shown in FIG. 3.
Figure 8:
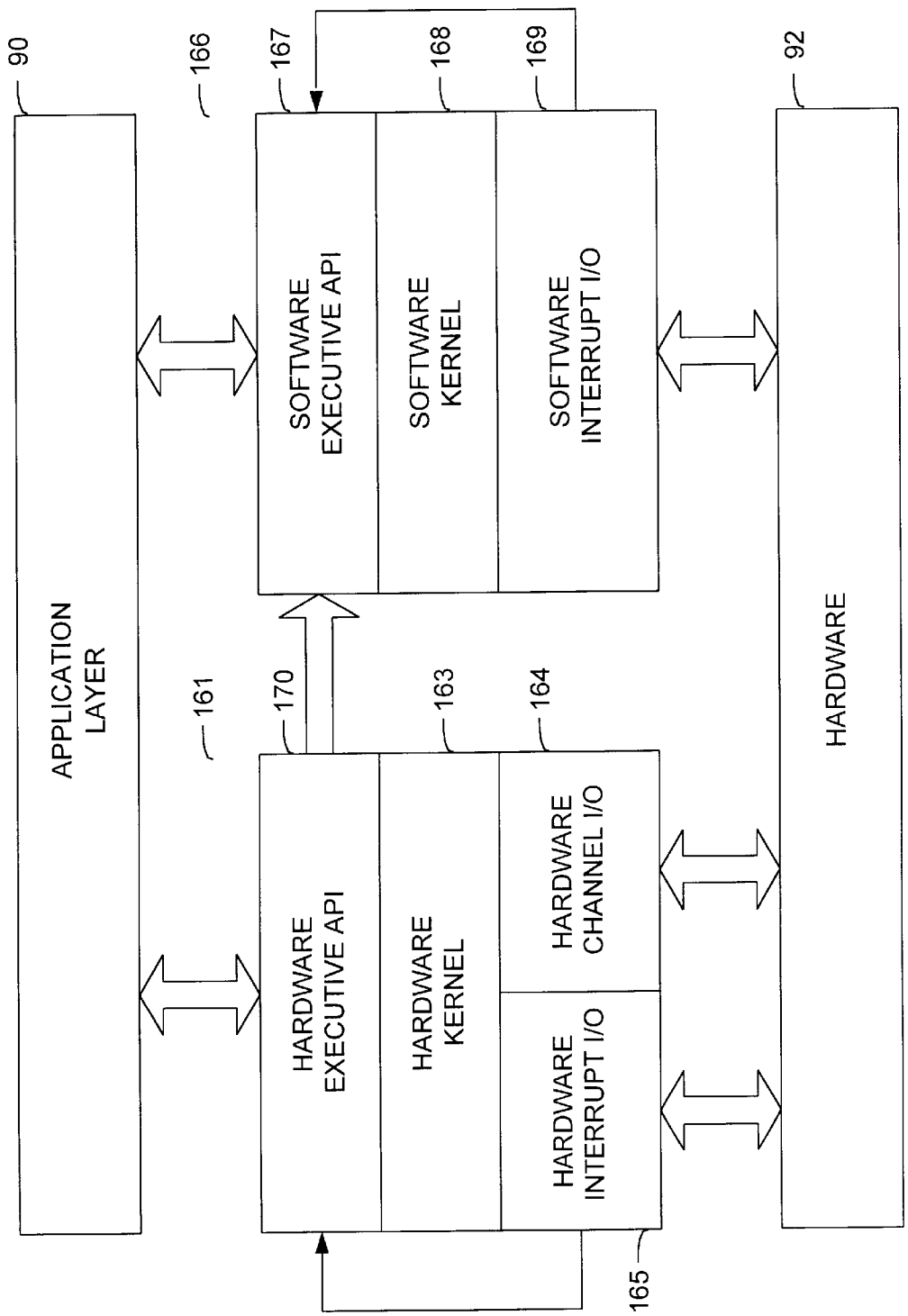
FIG. 8 is a block diagram illustrating the preferred embodiment of the invention containing both a hardware and software executive.

FIG. 8 is a block diagram illustrating the preferred embodiment of the invention containing both a hardware and software executive. Applications 90 can execute on a processor 92 by accessing executive functions of a real-time hardware executive 161 through a hardware API 162. Those executive functions are implemented as a hardware kernel 167 within the microprocessor itself. The diagram also shows two paths between the processor 92 and the kernel 167. The first path is a channel I/O 164 mechanism that can schedule processing automatically. The second path is a more traditional interrupt I/O 165 mechanism where an interrupt is generated by a hardware event, and a kernel function is called through the API 162 in a reentrant manner in order to schedule processing or perform a kernel function.

Applications 90 may also execute on a processor 92 by accessing executive functions of a real-time software executive 166 through a software API 167. The software API 167 in turn enters a kernel 168 to perform scheduling or context switching functions. For preemptive events which occur asynchronously to the currently running task, an interrupt I/O mechanism 169 must be in place to allow kernel functions to be invoked while the processor is within an interrupt. While in an interrupt, kernel functions are called using the software API 167 in a reentrant manner.

In addition, a hardware executive task or interrupt may invoke software executive functions through a special interface 170 between the hardware API 162 and the software API 167, as described below.

The STi5500 processor contains instructions for starting and changing execution (processes), as well as a two layer hardware scheduler. The two layers of hardware scheduling are referred to as the high priority queue and the low priority queue. In a hardware only scheduling environment, multiple threads of execution can be assigned to one queue by starting a thread, then starting another. When more than one thread exists in a queue, the hardware scheduler has control of when each thread is permitted to execute. If only one thread exists in a queue, then it is always executing and the hardware scheduler is not involved.

To make software and hardware schedulers work together in accordance with the invention, the software scheduler was designed to execute in the low priority queue, new context switch mechanics were put in place for the low priority queue, and the interrupt handling was designed to accommodate various types of preemption (e.g., high priority hardware threads, interrupts that do not make operating system calls, and interrupts that do make operating system calls). The resulting kernel is one that allows high priority threads to execute unimpeded by the software scheduler, thereby permitting the hardware processes to be serviced without latency, while allowing the low priority kernel to manage software processes in a traditional manner permitting prioritized management of software processes.

Kernel Register Usage

Figure 9:
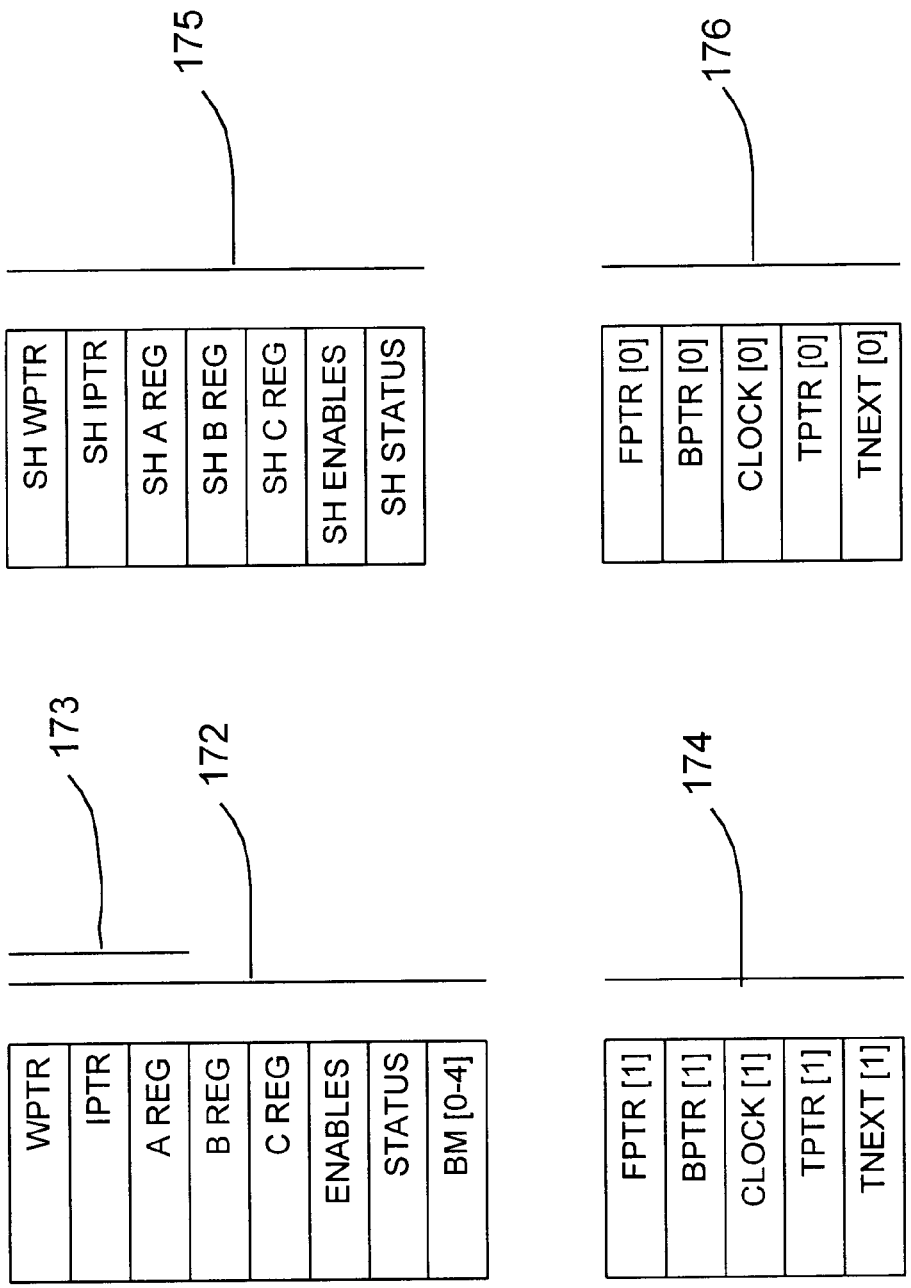
FIG. 9 shows the subset of microprocessor registers used to implement the high priority hardware executive and the low priority software executive.

FIG. 9 shows the subset of microprocessor registers used to implement the high priority hardware executive and the low priority software executive. The currently executing processing state is stored in a set of CURRENT STATE registers 172. This set of registers 172 includes a stack pointer WPTR, an instruction pointer IPTR, a three register operand stack (A, B, and C), an ENABLES register, a STATUS register, and 5 block move registers BM[0–4]. At any one time, the processor is executing in a space determined by these registers, in either the high priority queue or the low priority queue. Three CONTEXT SAVE registers 173 represent the minimal context save required by a voluntary context switch within the illustrated embodiment. In the preferred embodiment, one set 174 of registers in the STi5000 microprocessor are ignored because no low priority tasks are queued. A set of SHADOW registers 175 are used to preserve the contents of the CURRENT STATE registers 172 when a high priority task or high priority interrupt preempts a low priority task. Once the high priority queue is empty or descheduled, or the high priority interrupt returns, then the low priority context stored in the SHADOW registers 175 is restored to CURRENT STATE registers 172. A set of HARDWARE registers 176 are used by the hardware kernel 163 for automatic scheduling, and by the hardware API 162 for hardware executive task management.

Kernel Initialization

Kernel initialization involves setting up the kernel stack, setting the default ENABLES register, setting the software executive interrupt mask, and finally switching execution space to the low priority queue. The kernel stack must be set up in a manner common to operations that enter the kernel or which modify the kernel context. These operations include an initial switch to low priority space (described here), interrupt revectoring, kernel context save and restore (described later), and finally a normal call to the kernel.

Figure 10:
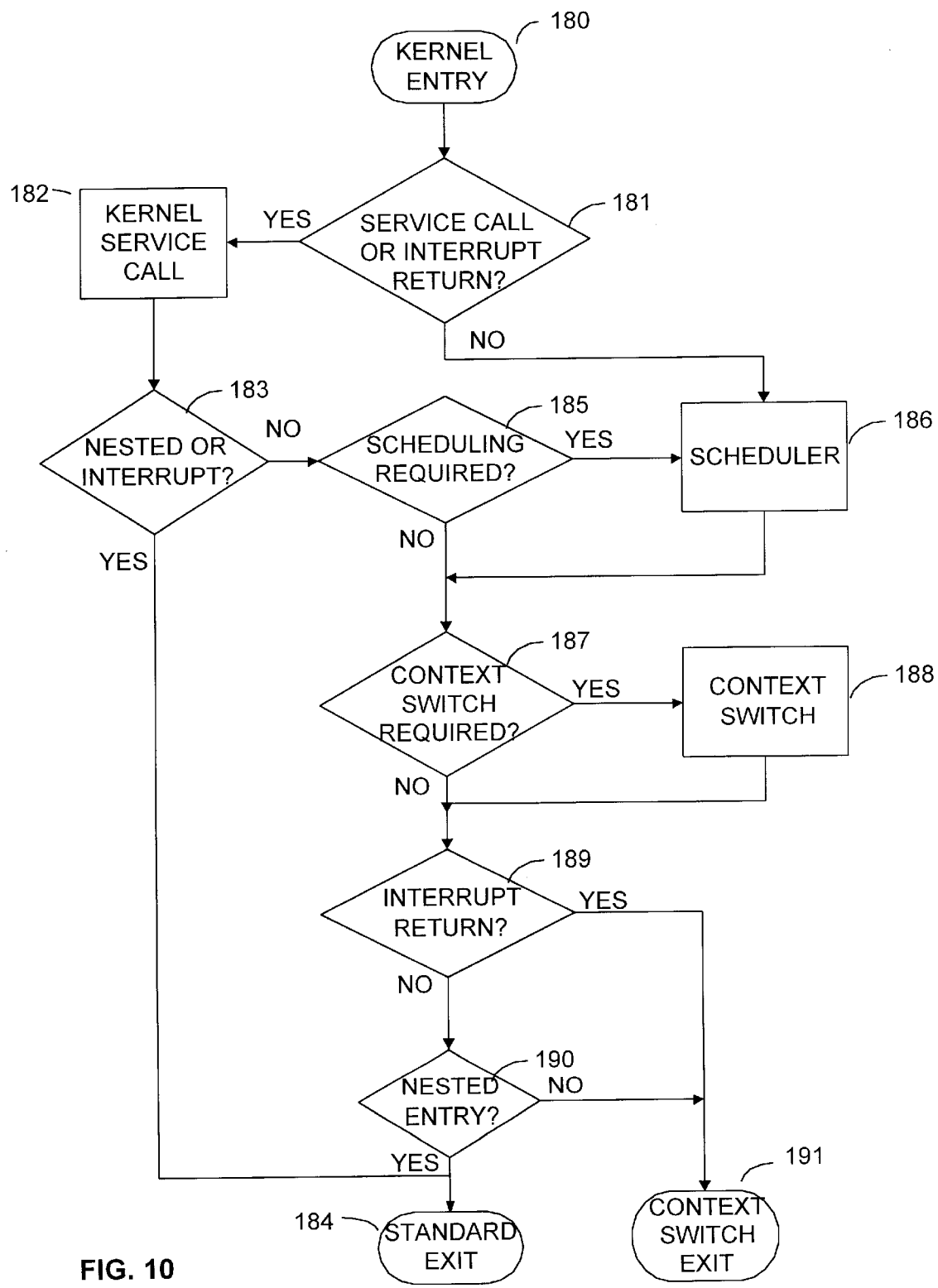
FIG. 10 is a flowchart illustrating a simplified kernel entry and exit routine in accordance with the preferred embodiment of the invention.

The common stack frame, pointed to by the stack register WPTR, must always be present when the instruction pointer IPTR points to the first instruction of the kernel entry function (STEP 180 in FIG. 10). The default ENABLES register is read on kernel initialization and saved in a global variable for later use during context restores. This is required to allow the software executive to work with the existing software executive interrupt mask the software executive interrupt mask is read and saved in another kernel global variable. This mask is used during kernel call interrupt disables, and prevents the kernel from disabling interrupts that are not allocated to the software executive. Finally, the execution space, which normally powers up in high priority, is changed to low priority. In the illustrated embodiment, the STi5500 processor instructions insertqueue and stopp are used to jump from the high priority space to low priority space, and jump into the kernel as well.

Preemption Types

Conventional processors have only one preemption type, which is an interrupt preempting a task. In the illustrated embodiment, the STi5500 microprocessor has four execution spaces, which permits 6 preemption types. The invention is designed to allow all 6 types to operate properly. By allocating the software kernel preemption method to the most appropriate preemption type, the objects of the invention are realized. Except for the preemption type allocated to the invention, the remaining preemption types operate in an automatic manner without intervention from the software executive 166. The preemption types and context save method are set forth in the following table, with preemption priority indicated in parenthesis; preemption type (6) is used by the software executive for task preemption:

| PRE-EMPTING EVENT | PREEMPTED EVENT | | |
|---|---|---|---|
| | high priority task | low priority interrupt | low priority task |
| High priority interrupt | (1) context saved on interrupt stack | (2) context saved in SHADOW registers | (3) context saved in SHADOW registers |
| High priority task | | (4) context saved in SHADOW registers | (5) context saved in SHADOW registers |
| Low priority interrupt | | | (6) context saved on interrupt stack |

Kernel Execution Path

The software kernel execution path remains conventional, but is augmented with functions that accommodate the hardware executive. In order to understand the design changes necessary to operate correctly alongside the hardware executive, it is necessary to understand the basic kernel design. FIG. 10 is a flowchart illustrating a simplified kernel entry and exit routine. Kernel entry (STEP 180) is a single point entry used by initialization, software executive interrupt revectoring, and standard service calls. When the kernel is entered, an entry counter is examined to determine whether it is a reentry. If not, the kernel adopts the kernel stack and copies the function input parameters to the new stack. Next, the call function input parameters are examined to determine if it is a service call or an interrupt return (STEP 181). If it is a service call, the routine jumps to the service call execution (STEP 182). If it is an interrupt return, the routine jumps to the scheduler, since the only reason for interrupt revectoring is if scheduling is needed (STEP 186).

Service calls may be made from interrupts or from tasks. If a service call was made from an interrupt (STEP 183), then the kernel is exited with a standard return (STEP 184). If the call is a nested call (STEP 183)—that is, if a kernel call was made from within the kernel in a reentrant manner—then the scheduling and context switching is deferred by exiting with a standard return (STEP 184). By deferring scheduling context switching when the kernel is nested, the process guarantees that all scheduling occurs only once, even though there may be several pending kernel calls that require a context switch. This prevents the case where calls are nested, and the last call gets the context switch rather than the highest priority call.

If not in an interrupt and not nested, then the kernel determines whether the scheduler needs to execute (STEP 185), and if so, the scheduler executes (STEP 186). Scheduling may or may not result in a context switch, since the current task may still be the highest priority and ready to run. If the context switch is needed (STEP 187), the context switch is executed (STEP 188).

If the kernel entry is from an interrupt return (STEP 189), then the context switch exit is forced to return to a task context after an interrupt revector occurred, even if a context switch has not occurred (STEP 191). If the kernel is currently nested and no context switch occurred (STEP 190), then a standard kernel return occurs (STEP 184), otherwise the routine performs a context switch exit (STEP 191).

Each task has an associated task control block that resides in system memory. When the kernel performs scheduling, it simply determines which task control block is going to be the next to execute when the kernel exits via a context switch exit (STEP 187). There are actually two types of context switches, one defined as real and the other as effective. The effective context switch refers to the process, STEP 188, within the kernel which changes the current running task to a new running task. The real context switch is actually the kernel's context switch exit, STEP 191, which changes the processor's executing context to the new running task, and this operation exits the kernel.

The effective context switch is implemented by changing the pointer to the current task control block to a new task control block. The real context switch has two types and two parts. The two types are voluntary and involuntary. The two parts of each type are the "context save" and the "context restore". Voluntary context switches occur when a task makes a kernel call that deschedules the current task. The voluntary context save simply saves the registers WPTR and IPTR.

An involuntary context switch involves using all the registers 172, so each of the registers must be saved and restored. Involuntary context switches occur when kernel calls from interrupts require scheduling. The involuntary context save is described in detail later as part of the interrupt return description.

Voluntary and involuntary context switches both use the same context restore method. Context restores are preferably implemented with the processor's restart instruction, which takes a pointer to an image of the new register set and begins execution with the new context. This context restore method is the mechanism that exits the kernel on a context switch, and importantly, switches context without knowledge of the hardware scheduler. Thus, the low priority queue can be managed solely by the software executive. More particularly, if a kernel call is made, the saved context in a task control block (TCB) is overwritten with the return code from the kernel call. The TCB is the image of a register set. When the task that made the kernel call is restored, the return code from the function call in the TCB is loaded into the A register, according to the function call convention of the processor and compiler, implementing a context restore. Thus, the CURRENT STATE registers are loaded by the kernel when a context switch occurs. While there are other methods of achieving context switches on the processor, this is the only method known to the inventor that does not involve the hardware scheduler and provides a built in critical section protection mechanism, described below.

The kernel path described above has numerous types of reentrancy modes, as with most conventional kernels. Generally, the kernel may be reentered any number of times, and interrupts may nest any number of times, within the limits of the system. In general, there are three requirements for each nest type: first, that the nesting be detected and tracked with a nest counter; second, that the kernel perform scheduling only when both interrupts and reentrant kernel calls are not nested; and third, that critical sections within the kernel (e.g., kernel variables) be protected from being overwritten during nested kernel entries. A critical section is defined as one where hardware or data may be changed by a nested call at the point where a decision is being made. This is also known as a race condition.

Interrupt/Execution Enables Hierarchy

In order to protect critical sections, kernels must disable other execution spaces from running while the critical section is executing. In a conventional executive, this is done simply by disabling all interrupts. However, this technique may lead to unacceptable latencies. Accordingly, the invention implements an "enables hierarchy" to deal with the various execution spaces in a manner that minimizes latencies.

Figure 11:
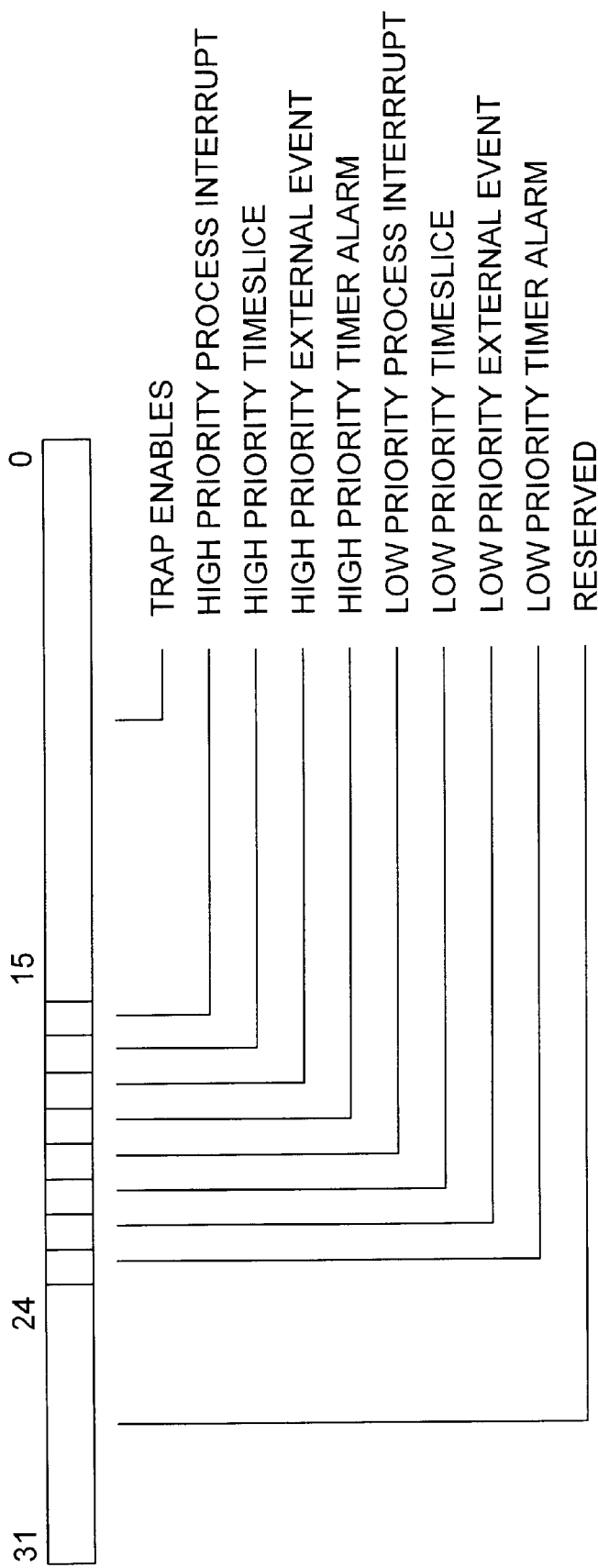
FIG. 11 is a diagram of the STi5500 ENABLES Register.

The preferred embodiment of the invention has three levels of enables. The first and most restrictive level of enables is the global execution disable. This uses the ENABLES register combined with a "global interrupt disable" instruction of the microprocessor (e.g., the gintdis instruction for the STi5500). The global interrupt disable instruction operates only on the global enables portion of the ENABLES register; thus, trap enables are always preserved. For example, FIG. 11 is a diagram of the STiS5500 ENABLES Register. To disable all execution space except for the current one in the illustrated embodiment, the global interrupt disable instruction is passed a value of "0xFF", which causes the instruction to disable bits 16 to 23 in FIG. 11. The preferred embodiment of the invention needs to invoke a global execution disable in the kernel only during the context switch exit (STEP 191 in FIG. 10). In conjunction with the restart instruction, the global execution disable operation provides a protected way to perform real context switches without interference from any other execution spaces, as well as an automatic reenable. Since the restart instruction loads a new ENABLES register value as part of the context switch exit (STEP 191), processing of a new task can begin with the proper ENABLES register value. Since the global execution disable operation only occurs during a kernel context switch exit, it is active only for a few instructions.

The second level of enables uses the low priority external event disable to disable only the interrupts that are allocated to the software executive, while leaving the hardware executive tasks and interrupts still enabled. This is an important aspect of the invention, in that it allows the hardware executive and interrupts to always run uninhibited (except for the few instructions that execute during a context switch exit). The kernel level has unknown reentrant levels and entry/exit points. It is not feasible (and may not be possible) to track enable/disable counts or masks, so a function that disables all software executive interrupts is needed. This level of critical section protection occurs within the kernel level, shown in FIG. 10, except for the kernel service call (STEP 182 in FIG. 10). In the illustrated embodiment, this level of enables is implemented with the gintdis instruction, but only a value of "0x40" is passed, thus disabling only the software executive interrupts (bit 22 in FIG. 11). When the kernel exits, it is guaranteed that all interrupts will be enabled because of the ENABLES register restore as part of the restart instruction.

Figure 12:
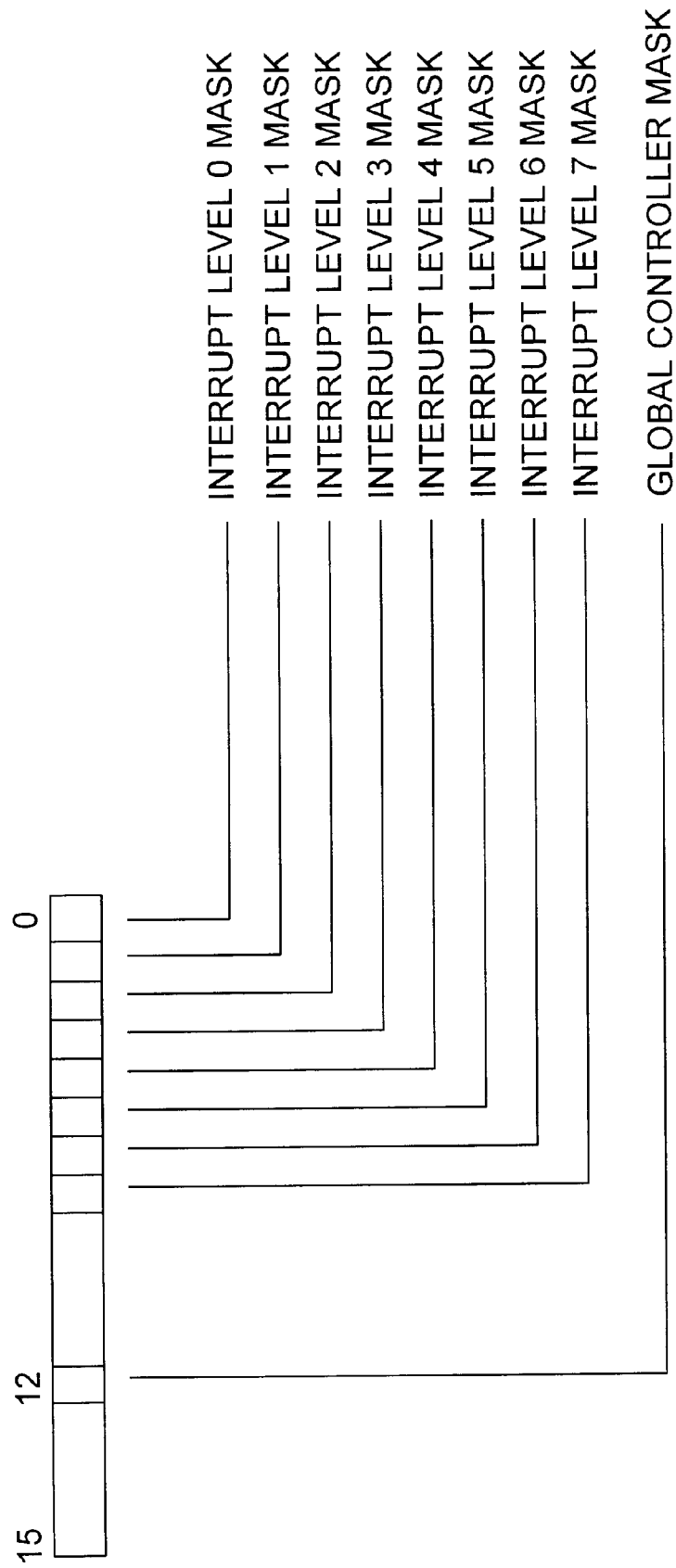
FIG. 12 is a diagram of the STi5500 Interrupt Controller Register, showing the interrupt controller registers that are modified to perform masking at the kernel call level.

The third level of enables uses the interrupt controller's mask to disable interrupts allocated to the software executive. This disable operation saves the mask read prior to the disable (i.e., as the mask existed when a kernel call has been invoked), ignores non-software executive interrupts as defined during kernel initialization, and restores the mask the way it found it when a kernel call has been completed. This is important at the kernel call level because kernel calls can modify the interrupt mask. Thus, the exiting mask must match the entry mask, necessitating the extra level of enables. FIG. 12 is a diagram of the STi5500 Interrupt Controller Register, showing the interrupt controller registers that are modified to perform masking at the kernel call level in the illustrated embodiment.

Figure 13:
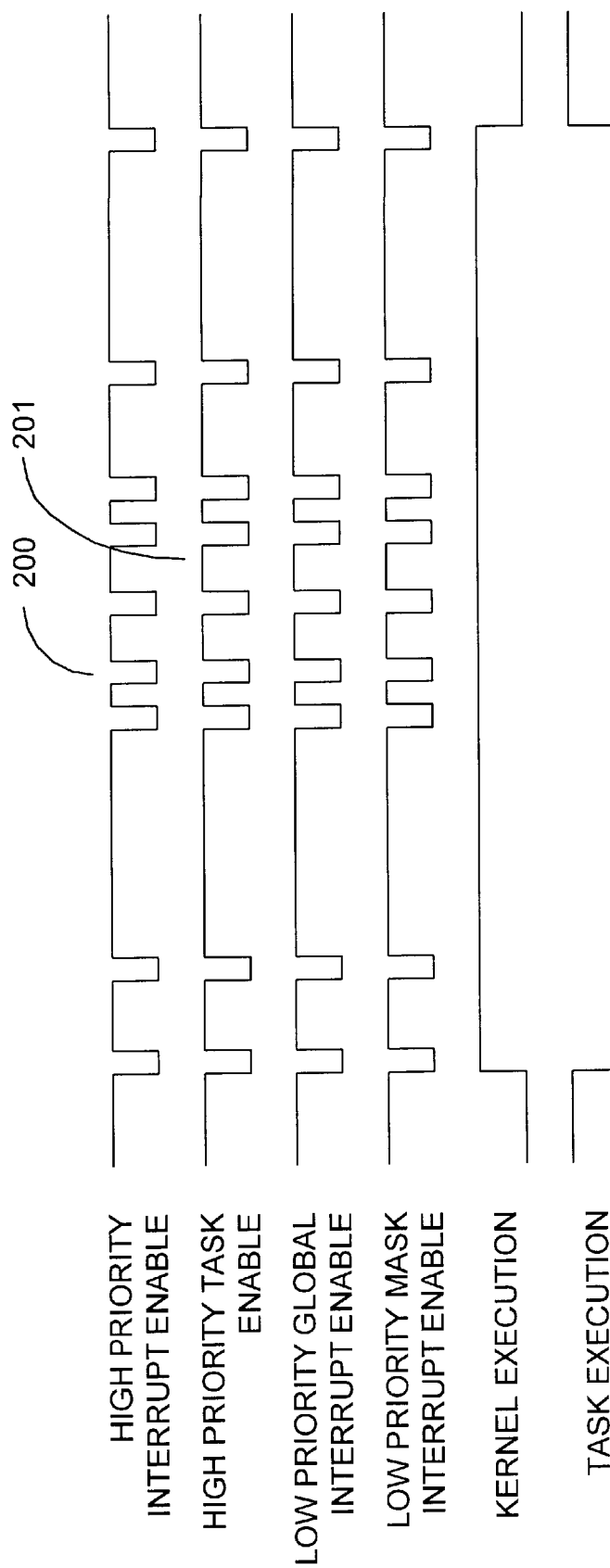
FIG. 13 is a timing diagram example of the enables method of a previous design.
Figure 14:
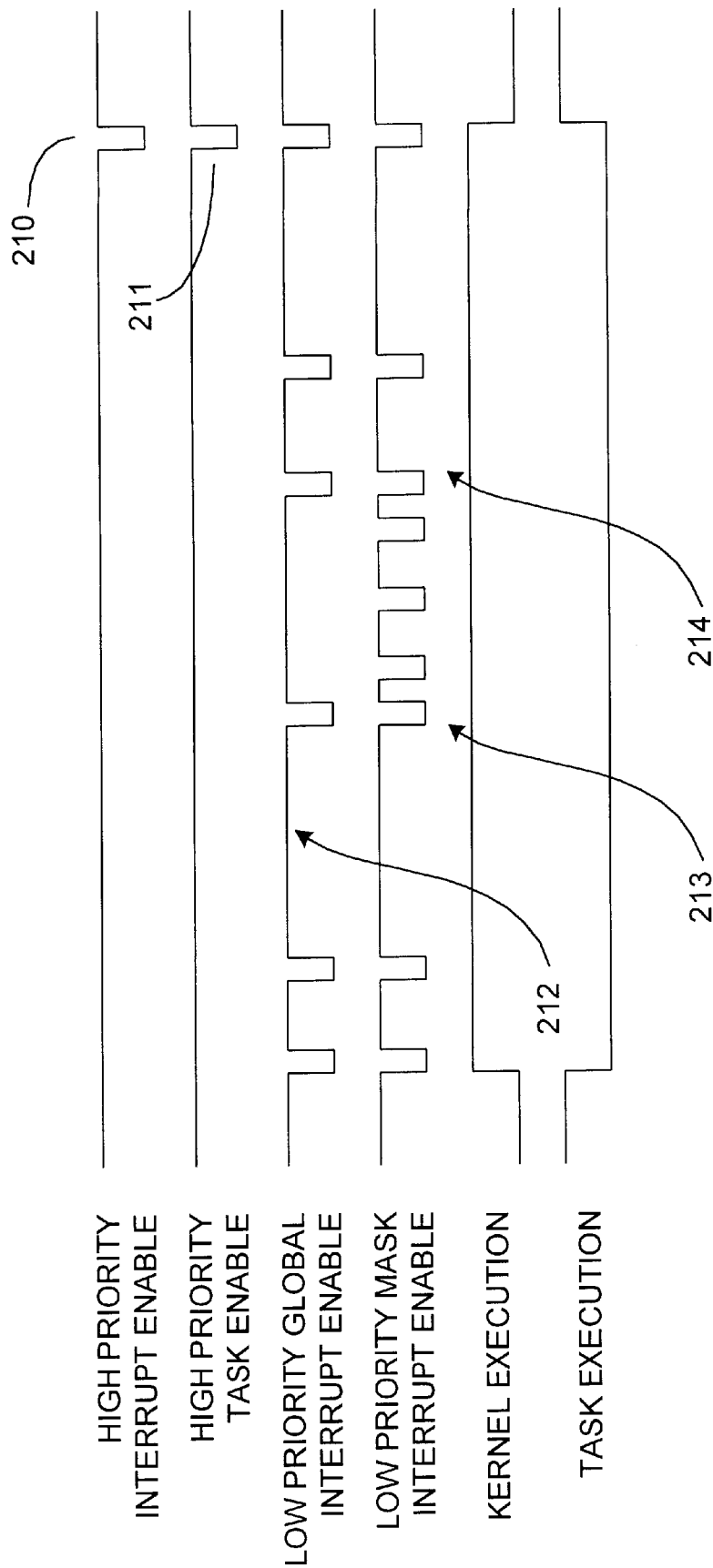
FIG. 14 is a timing diagram example of the hierarchical enables method of the preferred embodiment of the invention.

FIGS. 13 and 14 illustrate some of the advantages of the interrupt hierarchy. FIG. 13 is a timing diagram example of the enables method of a previous design, also developed by the inventor. To prevent high priority threads and interrupts from corrupting the low priority software-based executive critical sections, the processor's global disable instruction was used to prevent execution during critical sections. Regions 200 and 201 in the timing diagram show many latencies induced using this method, some of which are significant enough to prevent proper operation of high speed peripherals that may be allocated to high priority space. FIG. 14 is a fining diagram example of the hierarchical enables method of the preferred embodiment of the invention. The latencies for the high priority interrupts 210 and tasks 211 are minimized to a very short period that occurs only at each kernel context switch exit (STEP 191 in FIG. 10) and lasts for only a few instructions. The intermediate level of disable 212 also affects the lower levels of disable. Region 213 shows the beginning of the third level of disables that occur during kernel service call execution (STEP 182 in FIG. 10), and region 214 shows the end of the third level of disables, when the kernel service call execution completes.

Interrupt Entry and Exit

Interrupt entry and exit requires special processing in the interrupt service routine. The preferred embodiment of the invention implements interrupt entry and exit by placing a kernel function call at the beginning and the end of each software executive interrupt. The interrupt entry function maintains a nest counter that is used for determining interrupt nesting. The interrupt exit function decrements the nest counter when the interrupt exits. The interrupt exit function also checks for interrupt revectoring, and performs revectoring as necessary (see next section). The interrupt entry and exit functions both are compatible with the interrupt execution environment as setup by the hardware executive API. This environment provides an extra layer of interrupt "wrappering", so that when an interrupt is invoked, it first has to go through the hardware interrupt wrapper before the software executive interrupt routine is called. Conversely, all software executive interrupt return processing has to first go through the hardware interrupt wrapper before the processor actually returns from the interrupt. For the interrupt entry, this requires no special processing, but for the interrupt return, special processing (see next section) is required because the interrupt return is revectored into the software kernel when scheduling is required.

Interrupt Revectoring

Figure 15:
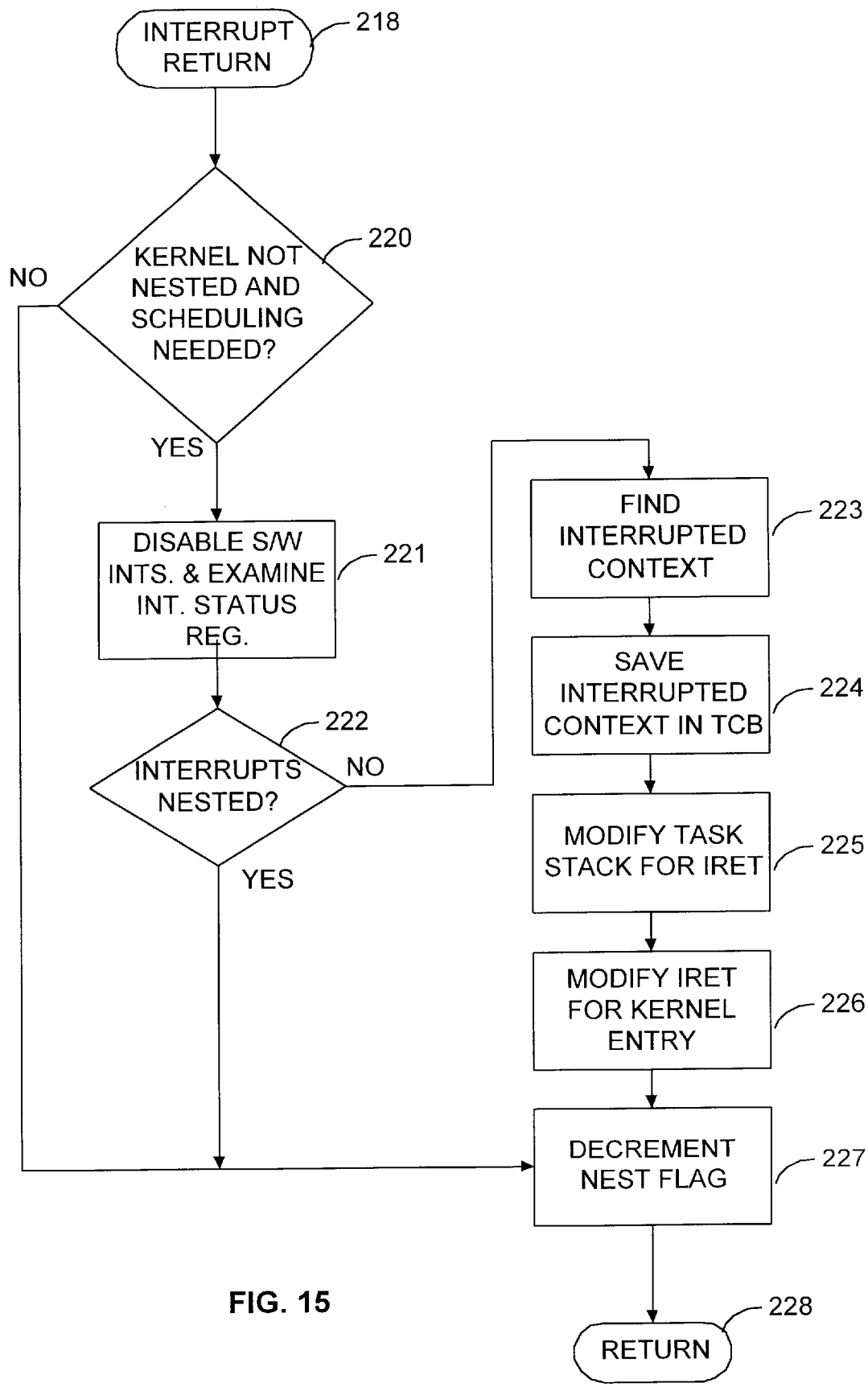
FIG. 15 is a flowchart illustrating the interrupt return portion of the current embodiment.

In the preferred embodiment of the invention, task preemption is implemented by revectoring the interrupt return when the software kernel requires rescheduling. FIG. 15 is a flowchart illustrating the interrupt return portion of the illustrated embodiment, and more particularly the process performed in STEP 191 of FIG. 10. First, it is determined whether or not the software kernel needs to be entered. If the kernel is not nested and scheduling is required (STEP 220), then the revectoring process begins, otherwise the interrupt nesting count is decremented (STEP 227) and the call returns normally to the calling interrupt for eventual return to the interrupted task (STEP 228).

If the revectoring process has begun, interrupt nest detection must be performed before revectoring can continue. The interrupt nest counter described earlier is not sufficient to detect all interrupts. In the nested case, an interrupt could preempt another before the interrupt nest counter is incremented. This case is detected by first disabling software executive interrupts and examining the processor interrupt controller's interrupt status register, which shows which interrupts have been taken and are currently active (STEP 221). The interrupts belonging to the hardware executive are masked from this operation to determine if interrupts are nested (STEP 222). If this second level of nest detection shows a hidden nested interrupt, the interrupt revectoring is abandoned and the process decrements the nest counter (STEP 227) and returns to the calling interrupt (STEP 228).

Once the current interrupt returns, the pending and nested interrupt will perform the interrupt revector when it subsequently executes. It is necessary to revector the interrupt return rather than just making a kernel call to perform scheduling, because the scheduling operation is too lengthy to be done in an interrupt. Accordingly, the interrupt is exited as quickly as possible so that kernel entry and scheduling may be done in task space rather than in interrupt space.

When interrupt revectoring is permitted and necessary (STEP 222), the next step is to find the interrupted context of the current interrupt (STEP 223). It is guaranteed that this is the only software executive interrupt that is active (due to the nesting filter) and that the interrupt is the only interrupt that is active (due to the fact that the processor requires that all high priority interrupts be assigned priorities greater than all low priority interrupts; thus, if a higher priority interrupt was active, it would be executing). To find the context of the current active interrupt in the illustrated embodiment, the invention indexes the interrupt vector table and obtains the interrupt workspace pointer. Using the interrupt workspace pointer, the interrupted context may be obtained. Once found, the interrupted context is saved in the current task control block (STEP 224). The interrupted context preferably is in the same format as the task control block, which preferably is also in the same format as required for the restart instruction. Thus, the involuntary context switch save and restore, and the interrupted context areas, all share the same format. Once the context is stored in the task control block, the task free stack area is modified for interrupt return (MET) to emulate the kernel entry stack (STEP 225). Next, the interrupt return context is changed to revector the execution into the kernel and the interrupt stack is modified to return to the kernel entry rather than to the interrupted task (STEP 226). In the illustrated embodiment, this is implemented by modifying the IPTR and WPTR on the interrupt stack. Once the revectoring modifications are made, the interrupt nest counter is decremented (STEP 227), and the call returns normally (STEP 228). This exit then returns to the hardware executive interrupt wrapper, which then calls the processor's interrupt return instruction to return to task space. However, rather than returning to the interrupted context, the execution returns to the kernel entry, with a kernel entry type denoting an interrupt return. Once in the kernel, software executive global interrupts are enabled; the software enable interrupts must be disabled during the interrupt return, or the interrupt nest detection will fail, since the interrupt return kernel entry assumes that no other interrupts will be active yet.

Block Move Processing

In the illustrated embodiment, the STi5500 microprocessor has a "block move" instruction that moves data very quickly. This instruction is interruptable, and requires special processing by the software executive. This processing occurs within the interrupt return function of FIG. 15 and in the kernel entry and exit routine of FIG. 10. In the illustrated embodiment, when a block move instruction is interrupted, the processor stores a special code in the STATUS register. When the interrupt returns, this special code tells the processor to complete the block move. More particularly, the preferred embodiment of the invention handles block moves by implementing special handling of the STATUS register in the interrupt revectoring and kernel code. When interrupt revectoring occurs, the STATUS register must contain a default value (i.e., 0x80000000 in the illustrated embodiment), or the block move status will tell the processor that a block move must be completed, and the processor will attempt to do so but with the wrong register values. Accordingly, the invention saves the interrupted context's STATUS register value in a special variable in the task control block. The interrupted context's STATUS register value is overwritten with the default value, such that a false block move is not executed on interrupt return. Next, once in the kernel, the special saved variable in the STATUS register is copied over to the regular task control block's copy of the STATUS register. After a kernel exit, the altered TCB is restarted (i.e., loaded into the STATUS register), thereby indicating that the interrupted block move operation must be completed. Finally, for issues of reentrancy, voluntary context saves that occur in a kernel service call (STEP 182) and in a context switch operation (STEP 188) force the saved STATUS register to the default value to prevent false block moves after normal calls.

Software Executive Calls From Hardware Executive

In some cases, the hardware executive tasks or interrupts need to communicate or synchronize with the software executive. The invention provides a mechanism to allow a hardware executive task or interrupt to invoke software executive functions through a special interface 170 between the hardware API 162 and the software API 167.

In the illustrated embodiment, the microprocessor's interrupt controller register has the ability to induce an interrupt without requiring an external event. This is done by writing to a register in the interrupt controller. To make a software kernel call from a hardware executive task or interrupt, a software executive interrupt routine is installed in the normal fashion as a low priority interrupt allocated to the software executive. This software-induced low priority interrupt routine contains the necessary software executive kernel call. Thus, the hardware executive interrupt or task can indirectly make a software executive kernel call by using the interrupt controller register to induce an interrupt that will invoke the software executive low priority interrupt routine. The effect of this is that the interrupt will execute after hardware tasks and interrupts have completed, thus preserving the absolute priority of the hardware executive task and interrupts.

In a particular embodiment, this aspect of the invention includes the following steps: setting a flag in an interrupt controller of the microprocessor; generating a hardware interrupt signal in response to the setting of such flag; invoking a low priority interrupt routine allocated to the software executive in response to such interrupt; executing a kernel call in the software executive from within such low priority interrupt routine. Accordingly, a task or interrupt within the hardware executive can indirectly cause execution of the kernel call in the software executive by inducing an interrupt upon setting such flag.

Computer Implementation

Except as specifically required by the invention, aspects of the invention may be implemented in hardware or software, or a combination of both. Preferably, the algorithms and processes of the invention noted as being software based are implemented in one or more computer programs executing on programmable systems each comprising at least one processor and at least one data storage system (including volatile and non-volatile memory and/or storage elements). Program code is executed on the processors to perform the functions described herein.

Each program may be implemented in any desired computer language (including machine, assembly, high level procedural, or object oriented programming languages) to communicate with a computer system. In any case, the language may be a complied or interpreted language.

Each such computer program is preferably stored on a storage media or device (E.g., ROM, CD-ROM, tape, or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Summary of Advantages

The invention is believed to provide the following advantages over hardware only or software only kernels:

Required Hardware Scheduler Use. For at least certain microprocessors, some on-chip peripherals require the use of processor hardware scheduling instructions.

Optional Hardware Scheduler Use. The invention permits designers to use special processor instructions that perform hardware scheduling automatically when certain hardware operations require service. This allows designers to make the decision to allocate some hardware operations/event handling to a high priority queue where needed, rather than just where required, as above.

Extremely Fast Response Time. A hardware scheduler can respond to a hardware event typically in about one-hundredth of the time required of a software scheduler (depending on which call is used).

Interrupt Usage Reduced. Using a hardware scheduler for high speed processing reduces the number of required interrupts and/or the amount of processing required at any one interrupt level. This provides a two-fold advantage. First, the high speed processing allocated to a high priority queue has zero overhead, thus overall execution time is reduced, and at the point where execution time is most critical. Second, given priority based interrupt levels, reducing the number of interrupts and/or the processing time in any level reduces latencies for all interrupts at all levels, compared with traditional interrupts managed by software kernels.

High Priority Interrupts Execute Unimpeded. Allocating non-operating system interrupts to a high priority mode allows the software executive to disable only low priority mode interrupts, thus providing the advantage of not disabling processing globally (as is done traditionally), which reduces any latency for the highest priority processing that has been allocated to high priority interrupts.

High Priority Threads Execute Unimpeded. Similarly, using an ENABLES register to only disable low priority mode interrupts also allows high priority threads or tasks to execute unimpeded, thus reducing latencies caused by global disable of processing.

Software Scheduler Allows Preemption. The hardware scheduler is non-preemptive, which means that the current thread runs until completion or until it voluntarily deschedules itself. Very fast or highly periodic operations are designed to execute in this manner and are suited to allocate to the hardware scheduler. However, less timely or processor intensive operations, if using the hardware scheduler, would induce catastrophic latencies in time critical hardware operations during periods where non-critical processing is occurring. Having non-critical processing allocated to a software scheduler, which provides preemptive scheduling, allows non-critical operations to execute without interfering with critical operations.

Software Scheduler Has Better Services. The hardware scheduler and its associated software provide a limited set of processing services such as event management and message passing. Having a full featured scheduler/kernel/operating system gives designers a much larger set of tools from which to build applications with, and having these tools part of the kernel allows better management of processing activities.

Unified Interrupt Management. Based on the inventive architecture, software kernel interrupt management and handling can be designed to integrate with existing libraries that are used for managing interrupts in a hardware scheduler environment. This prevents contention between two differing interrupt management services and provides designers with the same software interface.

Consistent Hardware Scheduler Application Interface. The commercial tools available for developing applications for the hardware scheduler preferably remain the same. Thus, there need be no added cost in tools, and embodiments of the invention permit reuse of applications or drivers designed for the hardware API.

Consistent Software Scheduler Application Interface. The commercial tools available for developing applications for the software scheduler preferably remain the same. Thus, there need be no added cost in tools, and embodiments of the invention permit reuse of applications or drivers designed for the software API.

A number of embodiments of the invention have been described. Nevertheless, it will be understood that various modifications may be made without departing from the spirit and scope of the invention. Accordingly, other embodiments are within the scope of the following claims.

What is claimed is:

1. A method for integrating a software executive within a microprocessor having an integral hardware executive, the microprocessor including a high priority scheduler, a high priority interrupt execution space, a low priority interrupt execution space, a high priority task execution queue, and a low priority task execution queue, the method including the steps of:

(a) allocating all tasks controlled by the software executive to the low priority task execution queue;

(b) allocating all software interrupts to the low priority interrupt execution space;

(c) allocating all tasks controlled by the high priority scheduler of the hardware executive to the high priority task execution queue; and (d) allocating all hardware interrupts to the high priority interrupt execution space;

whereby all low priority tasks are under the control of the software executive and all high priority tasks are under the control of the hardware executive, thereby permitting hardware processes within the microprocessor to be serviced by the hardware executive as high priority tasks without interruption by tasks under the control of the software executive.

2. The method of claim 1, further including the step of disabling all interrupts within the microprocessor except for trap enables during a context switch between tasks.

3. The method of claim 1, further including the step of selectively disabling only those interrupts within the microprocessor allocated to the software executive when necessary to enable the hardware executive and hardware interrupts to operate substantially uninhibited.

4. The method of claim 3, wherein the step of selectively disabling includes the step of asserting a low priority external event disable signal controlled by the hardware executive.

5. The method of claim 1, further including the step of disabling those interrupts within the microprocessor allocated to the software executive and interrupts selected by a mask and allocated to the hardware executive when necessary to preserve the mask as the mask existed when a kernel call has been invoked, thereby allowing the mask to be restored when the kernel call has been completed.

6. The method of claim 1, further including the step of permitting a hierarchical selectivity of preemption of tasks, including revectoring returns from pre-empted tasks to the software executive to enable execution of a new task.

7. The method of claim 1, further including the steps of:

(a) setting a flag in an interrupt controller of the microprocessor;

(b) generating a hardware interrupt signal in response to the setting of such flag;

(c) invoking a low priority interrupt routine allocated to the software executive in response to such interrupt;

(d) executing a kernel call in the software executive from within such low priority interrupt routine;

whereby a task or interrupt within the hardware executive can indirectly cause execution of the kernel call in the software executive by inducing an interrupt upon setting such flag.

8. The method of claim 1, further including the steps of:

(a) detecting when a block move operation is in progress when an interrupt occurs by monitoring a block move status flag within the microprocessor;

(b) storing a value indicating that a block move operation is being interrupted;

(c) re-setting the block move status flag within the microprocessor to a value that indicates no block move operation is being executed;

(d) processing the interrupt;

(e) setting the block move status flag within the microprocessor to the stored value to indicate that a block move operation was being executed, thereby allowing the microprocessor to complete the block move operation;

whereby executing block move operations within the microprocessor are preserved for the duration of an interrupt.

9. A computer program, residing on a computer-readable medium, for integrating a software executive within a microprocessor having an integral hardware executive, the microprocessor including a high priority scheduler, a high priority interrupt execution space, a low priority interrupt execution space, a high priority task execution queue, and a low priority task execution queue, the computer program comprising instructions for causing the microprocessor to:

(a) allocate all tasks controlled by the software executive to the low priority task execution queue;

(b) allocate all software interrupts to the low priority interrupt execution space;

(c) allocate all tasks controlled by the high priority scheduler of the hardware executive to the high priority task execution queue; and (d) allocate all hardware interrupts to the high priority interrupt execution space;

whereby all low priority tasks are under the control of the software executive and all high priority tasks are under the control of the hardware executive, thereby permitting hardware processes within the microprocessor to be serviced by the hardware executive as high priority tasks without interruption by tasks under the control of the software executive.

10. The computer program of claim 9, further including instructions for causing the microprocessor to disable all interrupts within the microprocessor except for trap enables during a context switch between tasks.

11. The computer program of claim 9, further including instructions for causing the microprocessor to selectively disable only those interrupts within the microprocessor allocated to the software executive when necessary to enable the hardware executive and hardware interrupts to operate substantially uninhibited.

12. The computer program of claim 11, wherein instructions for causing the microprocessor to selectively disable includes the step of asserting a low priority external event disable signal controlled by the hardware executive.

13. The computer program of claim 9, further including instructions for causing the microprocessor to disable those interrupts within the microprocessor allocated to the software executive and interrupts selected by a mask and allocated to the hardware executive when necessary to preserve the mask as the mask existed when a kernel call has been invoked, thereby allowing the mask to be restored when the kernel call has been completed.

14. The computer program of claim 9, further including instructions for causing the microprocessor to permit a hierarchical selectivity of preemption of tasks, including revectoring returns from preempted tasks to the software executive to enable execution of a new task.

15. The computer program of claim 9, further including instructions for causing the microprocessor to:

(a) set a flag in an interrupt controller of the microprocessor;

(b) generate a hardware interrupt signal in response to the setting of such flag;

(c) invoke a low priority interrupt routine allocated to the software executive in response to such interrupt;

(d) execute a kernel call in the software executive from within such low priority interrupt routine;

whereby a task or interrupt within the hardware executive can indirectly cause execution of the kernel call in the software executive by inducing an interrupt upon setting such flag.

16. The computer program of claim 9, further including instructions for causing the microprocessor to:

(a) detect when a block move operation is in progress when an interrupt occurs by monitor a block move status flag within the microprocessor;

(b) store a value indicating that a block move operation is being interrupted;

(c) re-set the block move status flag within the microprocessor to a value that indicates no block move operation is being executed;

(d) process the interrupt;

(e) set the block move status flag within the microprocessor to the stored value to indicate that a block move operation was being executed, thereby allowing the microprocessor to complete the block move operation;

whereby executing block move operations within the microprocessor are preserved for the duration of an interrupt.

* * * * *